United States Patent [19]

Thary

[11] Patent Number: 5,096,760
[45] Date of Patent: Mar. 17, 1992

[54] COVERED SOFT FOAM ARTICLE

[75] Inventor: Christian Thary, Farmington Hills, Mich.

[73] Assignee: Creme Art Corporation, Walled Lake, Mich.

[21] Appl. No.: 383,219

[22] Filed: Jul. 20, 1989

[51] Int. Cl.$^5$ .................. B32B 5/20; B32B 5/24
[52] U.S. Cl. .......................... 428/71; 5/481; 297/219; 297/DIG. 1; 428/85; 428/160; 428/308.4; 446/369
[58] Field of Search .............. 428/71, 85, 160, 308.4, 428/309.9; 264/46.6, 46.7; 5/481; 297/219, DIG. 1; 446/369

[56] References Cited

U.S. PATENT DOCUMENTS

| | | | |
|---|---|---|---|
| 2,625,499 | 1/1953 | Nebesar | 428/246 |
| 2,629,678 | 2/1953 | Thompson et al. | 428/246 |
| 2,948,651 | 8/1960 | Waag | 428/86 |
| 3,123,403 | 3/1964 | Hood | 264/46.7 X |
| 3,440,307 | 4/1969 | Printz | 428/100 X |
| 3,499,065 | 3/1970 | Hoskinson et al. | 428/160 X |
| 3,574,667 | 4/1971 | Fournier | 428/246 |
| 3,795,722 | 3/1974 | Sassaman | 264/46.4 |
| 3,932,252 | 1/1976 | Woods | 264/46.4 X |
| 4,170,086 | 10/1979 | Hills | 446/372 |
| 4,182,641 | 1/1980 | Fitts | 428/309.9 X |
| 4,190,697 | 2/1980 | Ahrens | 428/309.9 |
| 4,214,994 | 7/1980 | Kitano et al. | 428/246 X |
| 4,247,347 | 1/1981 | Lischer et al. | 264/46.6 X |
| 4,247,348 | 1/1981 | Lischer | 264/46.6 X |
| 4,264,386 | 4/1981 | Sears, Jr. et al. | 264/46.6 X |
| 4,268,557 | 5/1981 | Bracesco | 428/71 |
| 4,274,673 | 6/1981 | Kifferstein | 5/437 X |
| 4,287,143 | 9/1981 | Sears, Jr. et al. | 264/46.6 X |
| 4,304,812 | 12/1981 | Perkins | 428/247 |
| 4,350,734 | 9/1982 | Hammond | 428/308.4 |
| 4,389,447 | 6/1983 | Disselbeck et al. | 428/246 X |
| 4,389,454 | 6/1983 | Horacek et al. | 428/318.6 |
| 4,405,681 | 9/1983 | McEvoy | 428/309.9 |
| 4,502,234 | 3/1985 | Schaefer et al. | 428/246 X |
| 4,544,598 | 10/1985 | Meiller et al. | 428/246 |
| 4,559,094 | 12/1985 | Hostetler et al. | 264/46.6 X |
| 4,755,411 | 7/1988 | Wing et al. | 428/309.9 X |
| 4,816,328 | 3/1989 | Saville et al. | 428/246 |
| 4,927,694 | 5/1990 | Matsuura | 428/309.9 X |

*Primary Examiner*—Henry F. Epstein
*Attorney, Agent, or Firm*—Brooks & Kushman

[57] ABSTRACT

A soft foam article (20) and a method for making the article are disclosed as including a permeable cover (24) of a cloth type sheet construction having an interior (26) and an exterior (28) as well as including an open cell soft polyurethane foam (30) molded in situ within the cover in direct engagement with the cover interior without permeating the cover. The soft foam article (20) is disclosed as a soft toy (22) and as seating components embodied by a seat cushion (52), a seat back (54), a headrest (56), and an armrest (58). The in situ molding of the soft polyurethane foam is achieved by the use of an aqueous gel coating (34) on the cover interior (26) so as to prevent a liquid foam mixture from permeating the cover while still permitting escape of any air within the cover and of gas generated during the foaming. Best results are achieved when the aqueous gel includes water and an acrylic acid polymer that is acid neutralized to increase its viscosity to the range of about 60,000 to 100,000 centipoise and most preferably to about 80,000 centipoise.

15 Claims, 3 Drawing Sheets

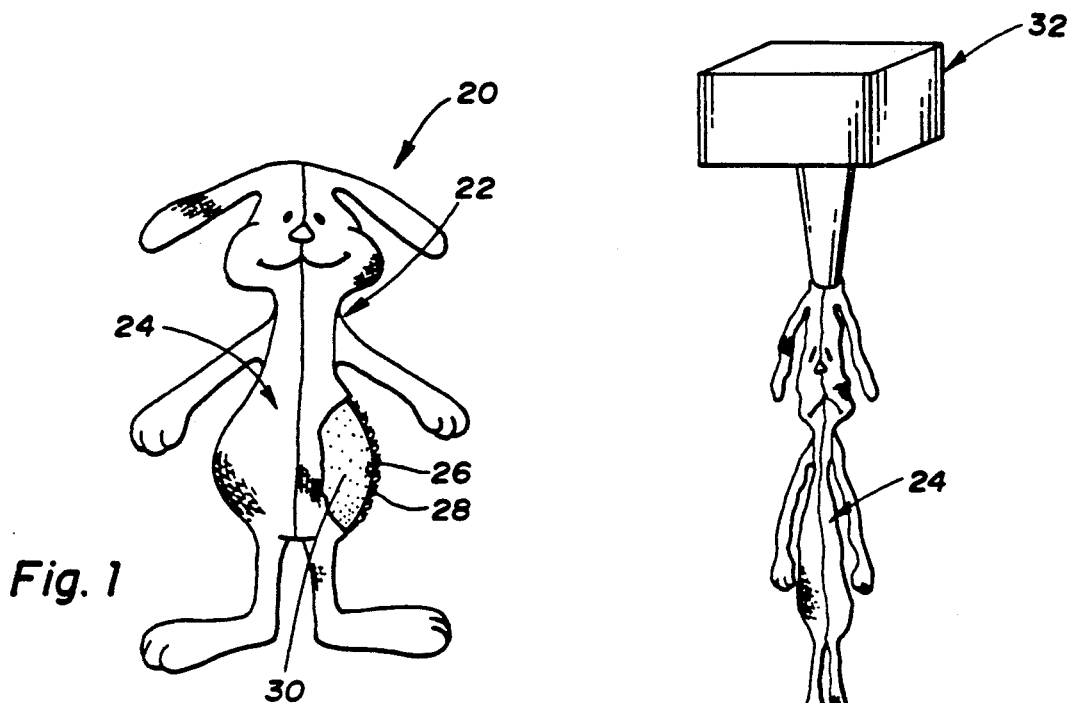
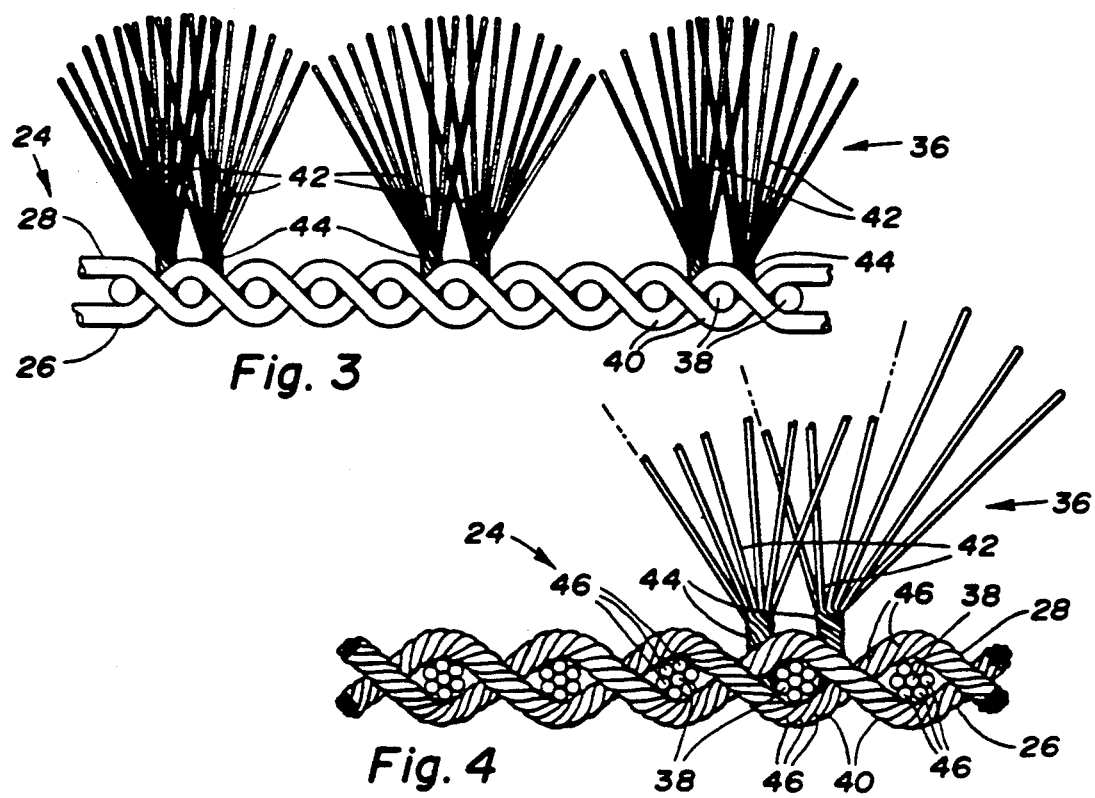

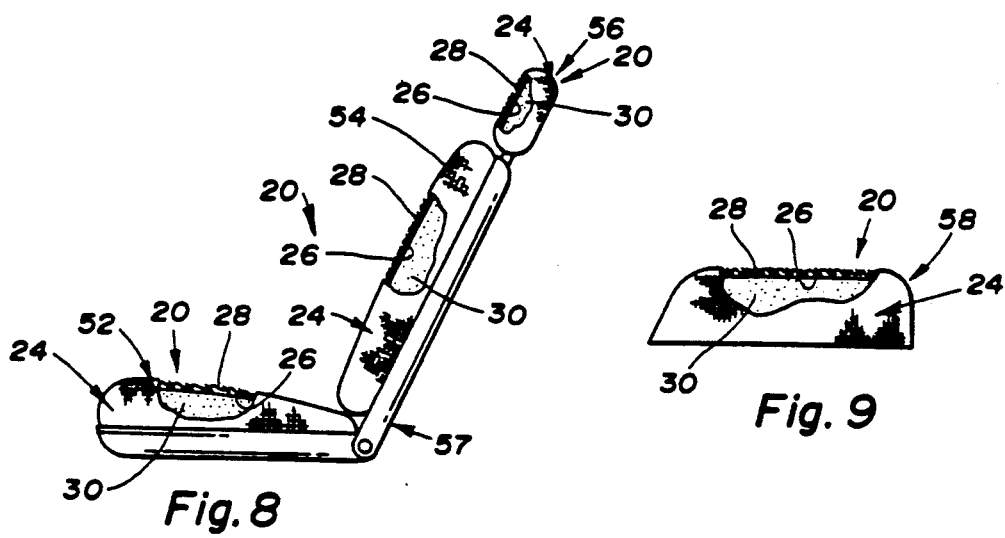
Fig. 8
Fig. 9
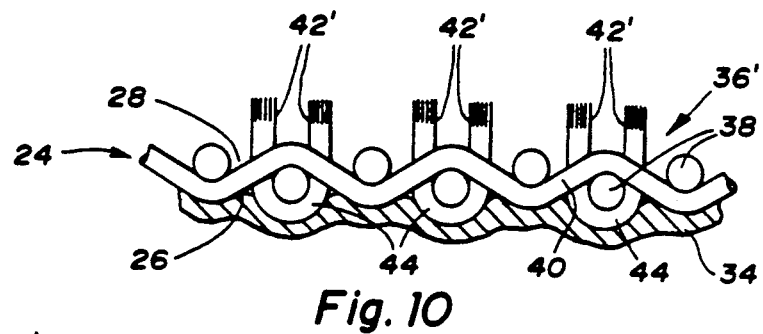
Fig. 10
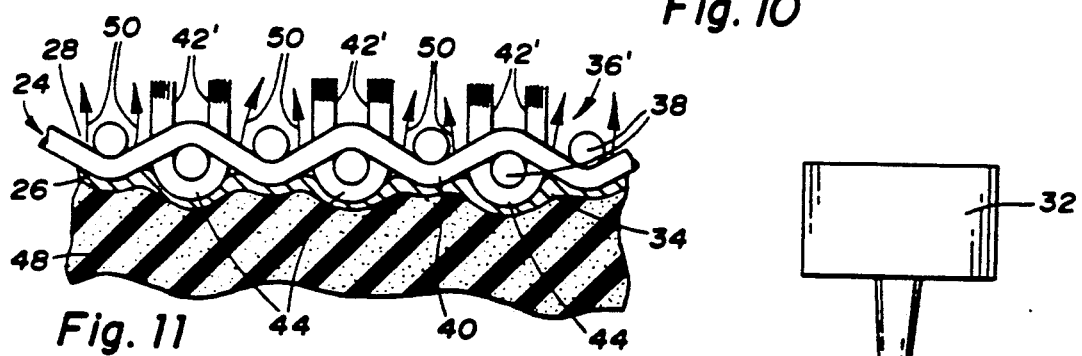
Fig. 11
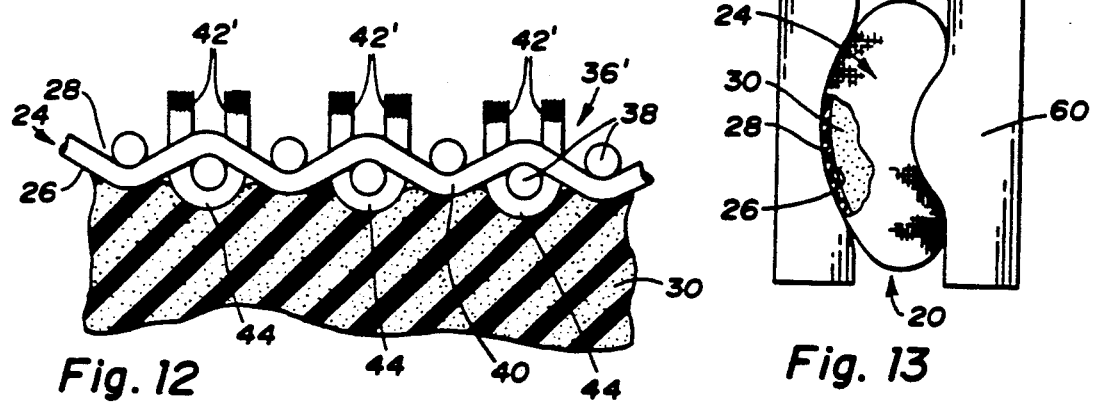
Fig. 12
Fig. 13

COVERED SOFT FOAM ARTICLE

TECHNICAL FIELD

This invention relates to a covered soft foam article and also relates to a method for making the article.

BACKGROUND ART

Most prior art covered soft articles such as plush toys having an animal shape or another shape are made by hand stuffing cotton, foam, or another soft filler into a permeable cloth cover. In view of the manual labor involved to provide the stuffing, such covered soft articles are relatively expensive to manufacture and are not evenly filled so as to have uniform softness. Also, large toys in order to be able to stand erect must be stuffed so hard as not to have the desired softness. Attempts to overcome these problems have not previously permitted the use of in situ polyurethane foam molding within a permeable cover since the liquid foam mixture utilized to provide the foaming permeates the cover and makes it stiff and nonporous.

The most common approach to preventing polyurethane liquid foam mixtures from permeating cloth covers is to utilize an intermediate foam liner such as illustrated by U.S. Pat. No. 4,544,598 Neiller et al. However, such foam liners substantially increase the cost of the cover and thereby reduce if not completely eliminate the savings achieved by eliminating the manual stuffing operation. Another prior attempt to provide polyurethane in situ foam molding within a porous cover is disclosed by U.S. Pat. No. 3,932,252 Woods, wherein a coating which may be water based is applied to the exterior surface of a porous fabric cover prior to positioning thereof within a mold with the coating facing the mold cavity surface. However, this coating on the outer cover surface does not prevent the liquid foam mixture that is molded in situ within the cover from permeating the cover and thereby stiffening the cover and filling its interstices so as not to be breathable.

Laminating of a foam layer to another layer has also been previously done in the past and, for the most part, has been with the foam layer adhered to another impervious layer such as disclosed by U.S. Pat. Nos. 2,625,499 Nebesar; 2,948,651 Waag; 3,499,065 Hoskinson et al; and 3,795,722 Sassaman. Laminating of a liquid foam layer to a porous layer also results in the foam permeating the porous layer. Such laminating is disclosed by U.S. Pat. Nos. 2,629,678 Thompson et al; 3,440,307 Printz; 4,389,447 Disselbeck et al; 4,502,234 Schaefer et al; and 4,816,328 Saville.

Other prior art references noted during the investigation conducted in connection with the present invention but which are believed to be less relevant than the references discussed above include U.S. Pat. Nos. 3,574,667 Fournier; 4,182,641 Fitts; 4,190,697 Ahrens; 4,214,994 Kitano et al; 4,389,454 Horacek et al; and 4,405,681 McEvoy.

DISCLOSURE OF INVENTION

One object of the present invention is to provide an improved soft foam article with a breathable cover. The improved soft foam article is less expensive manually stuffed soft articles and also has uniform softness even with relatively large sizes.

In carrying out the above object and other objects of the invention, a soft foam article constructed in accordance with the invention includes a permeable cover of a cloth type sheet construction having an interior and an exterior, and the interior of the cover having a dried residue of an aqueous gel composition. An open cell soft polyurethane foam of the article is molded in situ within the cover in direct engagement with the interior of the cover without permeating the cover such that the flexibility and breathability of the cover is not inhibited by the foam.

Different embodiments of the article may have the foam either bonded to the cover interior when such bonding is desirable or free to move with respect to the cover interior when it is desirable for the cover not to be bonded to the foam.

In one practice of the invention, the soft foam article is embodied as a toy with the exterior of its cover provided with a plush pile. Such toys are often shaped as an animal but can also be otherwise shaped such as a ball, airplane, or automobile, etc.

In another practice of the invention, the soft foam article is embodied as a seat component and is specifically disclosed as being either a seat cushion, a seat back, a headrest, or an armrest. When made as a seat component or for various other uses, the soft foam article may also include a support member that cooperates with the cover to define a cavity receiving the foam. Such a combination requires that the cover define at least 50% of the outer area of the article so as to have sufficient area for the gas to escape during the foaming as the foam is in situ molded.

Another object of the present invention is to provide an improved method that permits the manufacture of the soft foam article.

In carrying out this object, the method for making the soft foam article is performed by coating the interior of a permeable cover with an aqueous gel and then introducing a foamable polyurethane liquid mixture, capable of foaming to an open cell soft foam, into the cover for foaming. During such foaming, the foam fills the cover while the gel permits escape of any air within the cover and escape of gas generated by the foaming but prevents the liquid mixture from permeating the cover as in situ molding of an open cell soft foam takes place within the cover in direct engagement with the interior of the cover without permeating the cover.

In the preferred practice of the method, the aqueous gel utilized includes water and an acrylic acid polymer that is acid neutralized to increase its viscosity. Most preferably, the aqueous gel utilized has a viscosity in the range of about 60,000 to 100,000 centipoise and ideally about 80,000 centipoise.

The aqueous gel utilized may also include cross linkers for reacting with the molded foam surface engaged with the cover interior.

In performing the method, both outwardly convex shapes as well as a partially outwardly concave shape can be provided to the soft foam article. More specifically, the cover utilized may function as the sole mold component for the foam during the in situ molding of the foam with an outwardly convex shape. A shaping member may also be utilized to engage the exterior of the cover to provide a portion thereof with an outwardly concave shape that may be required for the specific soft foam article to be manufactured.

The objects, features, and advantages of the present invention are readily apparent from the following detailed description of the best modes for carrying out the invention when taken in connection with the accompanying drawings.

BRIEF DESCRIPTION OF DRAWINGS

FIG. 1 is a partially broken-away perspective view of a soft foam article embodied by a toy shaped as an animal and constructed in accordance with the present invention;

FIG. 2 is a view illustrating the manner in which a foamable polyurethane liquid mixture is introduced into a cover of the toy embodying the soft foam article;

FIG. 3 is an enlarged sectional view illustrating the construction of the cover as having yarn to which a plush pile is secured;

FIG. 4 is a further enlarged view of the cover showing the yarn thereof as being made of wound fibers;

FIG. 8 is a partially broken away view illustrating the soft foam article as seat components including a seat cushion, a seat back, and a headrest;

FIG. 9 is a partially broken away view of an armrest that also functions as a seating component and embodies a soft foam article constructed in accordance with the present invention;

FIG. 10 is a sectional view of the cover utilized with each of the embodiments of FIGS. 8 and 9 and is illustrated as having an aqueous gel coating on its inner surface in accordance with the present invention;

FIG. 11 is a view similar to FIG. 10 illustrating the cover after foam has been introduced into the cover for in situ molding in accordance with the invention;

FIG. 12 is a sectional view similar to FIG. illustrating the cover after the foaming has been completed; and FIG. 13 is a view similar to FIG. 2 illustrating how the soft foam article of the invention is made with a concave exterior.

BEST MODES FOR CARRYING OUT THE INVENTION

Figure 5:
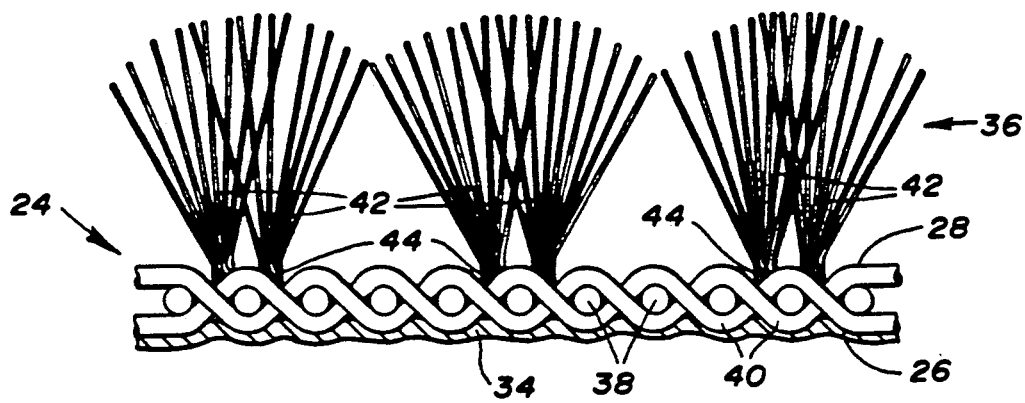
FIG. 5 is a view of the cover that illustrates the manner in which an aqueous gel is applied to the cover interior prior to introduction of the foamable polyurethane liquid mixture into the cover as illustrated in FIG. 2.

With reference to FIG. 1 of the drawings, a covered soft foam article constructed in accordance with the present invention and made in accordance with the method thereof is indicated generally by 20 and is illustrated as a toy 22 of an animal shape. However, as will be hereinafter apparent, it should be appreciated that the soft foam article can also be constructed for other purposes than toys and that its construction as a toy can be other than of an animal shape, such as, for example, a ball, an automobile, an airplane, etc.

With continuing reference to FIG. 1, the soft foam toy 22 is illustrated as having a permeable cover 24 of a cloth type sheet construction having an interior 26 and an exterior 28. The interior 26 of the permeable cover 24 has a dried residue of an aqueous gel composition as is hereinafter more fully described. An open cell soft polyurethane foam 30 of the toy is molded in situ within the cover 24 in direct engagement with the interior 26 of the cover without permeating the cover in a manner that has not heretofore been possible. As such, the cost previously involved with manually stuffing such a toy is eliminated while still providing an article whose cover is breathable and not stiffened as would result if the foam permeated the cover.

Manufacturing of the soft foam toy 22 is performed as shown in FIG. 2 by introducing a foamable polyurethane liquid mixture from a source 32 into the permeable cover after first applying a coating of an aqueous gel 34 to the interior 26 of the cover as shown in FIG. 5. The foamable polyurethane liquid mixture utilized may be of any conventional fast reaction type whose polyol and isocyanate components are mixed with conventional catalysts to speed the reaction such that the viscosity rapidly increases to a foam state within a minute and preferably less than 30 seconds, and with the best results being in less than 10 seconds. Expansion takes place during the foam state to fill the cover just before gas generated by the reaction breaks the cells to provide the open cell structure of the resultant soft foam.

As shown in FIGS. 3 and 4, the cover 24 utilized with a soft toy has its exterior 28 provided with a plush pile 36 as is customary with such toys. More specifically, the cover includes warp yarn 38 and woof yarn 40, while the exterior plush soft pile 36 is provided by tufts 42 associated in pairs that each have a connector yarn 44 extending around an associated warp yarn 38 in a conventional fashion. Furthermore, as illustrated in FIG. 4, both the warp yarn 38 and woof yarn 40 are wound from a plurality of fibers 46 in a conventional fashion as is also each connector yarn 44.

Figure 6:
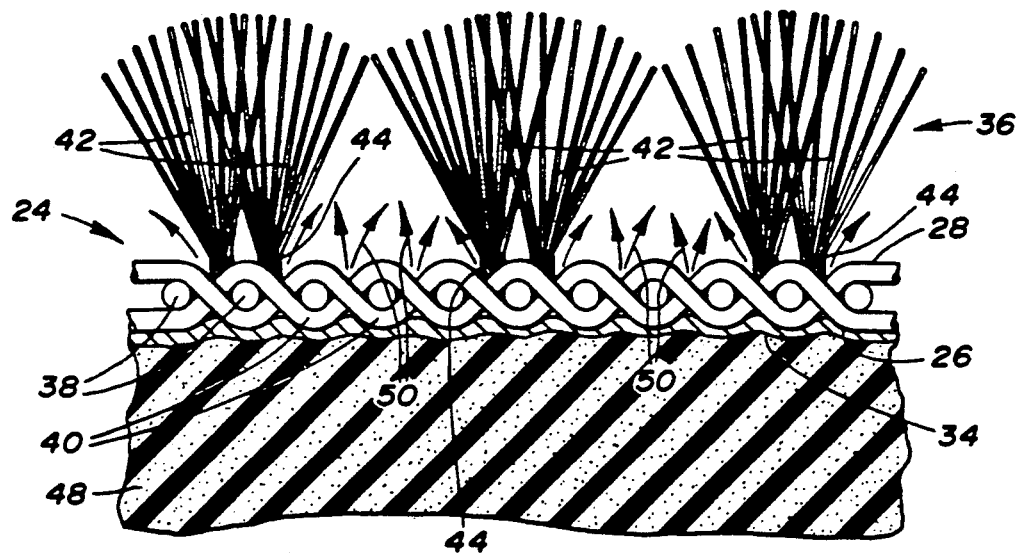
FIG. 6 illustrates the manner in which the aqueous gel permits the liquid foam mixture to expand along the cover during the foaming without permeating the cover while still permitting gas to escape during the foaming.
Figure 7:
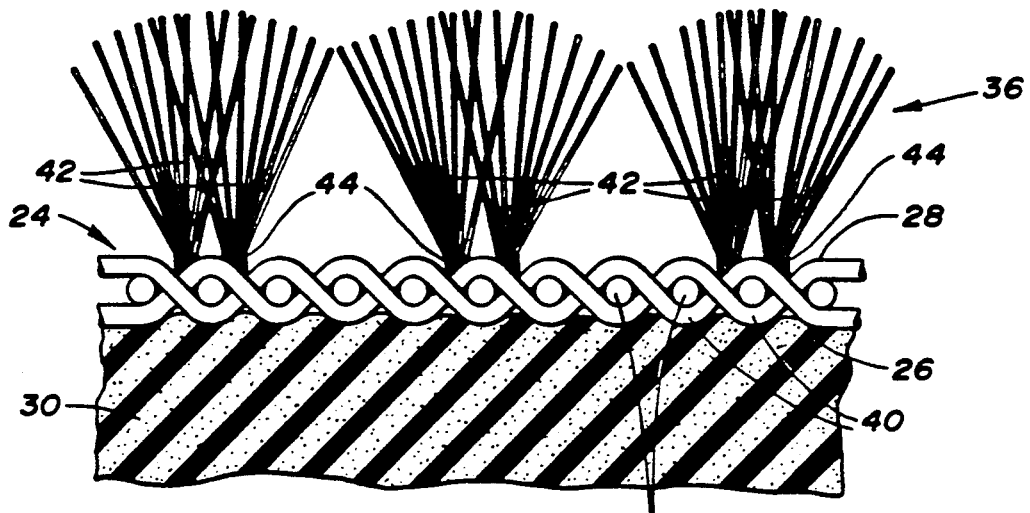
FIG. 7 is a view of the cover and the foam illustrated after the foaming in direct engagement with the interior of the cover.

As previously described in connection with FIG. 5, the aqueous gel 34 is coated onto the interior 26 of the cover 24 so as to cover its warp yarn 38, woof yarn 40, and connector yarn 44 of the plush pile 36. This gel coating of the cover interior is most preferably provided by spraying so as to reduce cost, but it can also be provided by brushing, troweling, or any other suitable way that fully coats the interior 26 of the cover. The aqueous gel coating 34 fills the interstices between the yarn fibers as well as filling the pores between the yarns. As such, the aqueous gel coating 34 on the cover interior 26 prevents the foamable polyurethane liquid mixture 48 introduced into the cover as shown in FIG. 6 from permeating the cover. More specifically, the aqueous gel coating 34 prevents the foamable polyurethane liquid mixture 48 from permeating the warp yarn 38, woof yarn 40, and connector yarn 44 as well as preventing the liquid mixture from passing through the interstices between the yarns sufficiently to permeate the tufts 42 of the exterior soft pile 36. However, the gel coating 34 does permit any air within the cover and gas generated during foaming of the liquid mixture 48 to escape through the cover as shown by the simulated gas flows 50. Prior to the gas bubbles bursting and the gas escaping from the foam through the cover, the aqueous gel absorbs heat from the foam to slow down the polymer at the foam surface adjacent the cover interior 26. Such heat absorption starts and normally completes drying of the aqueous gel as foam curing takes place to provide the open cell soft foam 30 previously described in connection with FIG. 1. The heating thus leaves a dried residue of the aqueous gel composition on the interior 26 of the permeable cover 24. The cured foam 30 is directly engaged with the cover interior 26 as shown in FIG. 7 without permeating the warp yarn 38, woof yarn 40, connector yarn 44, or the tufts 42 of the plush pile 36. As such, the in situ molded foam is not located between the fibers of the yarns such that the cover 24 remains pliable and breathable. The cured foam also has a uniform density so as to have uniform softness.

The foamable polyurethane liquid mixture 48 utilized must be capable of foaming to an open cell soft foam. More specifically, the liquid mixture 48 must have sufficient foaming ability to generate gas that breaks the bubbles during the foaming to thereby provide the open cell structure. Such gas moves in the flows 50 previously described as illustrated in FIG. 6 after first passing through the aqueous gel coating 34 on the interior of the cover.

It should be appreciated that the aqueous gel coating 34 can be initially coated onto the cover interior 26 immediately prior to the introduction of the polyurethane foam liquid mixture 48 into the cover or can be applied well ahead of that time such that the gel coating first dries as its water evaporates while leaving the remaining components of the gel such that they can be rewetted to again form the gel. In the latter case, water is applied to the cover interior 26 before the mixture 48 is introduced into the cover to thereby again provide the gel coating 34.

In the preferred practice of the invention, the aqueous gel utilized to provide the gel coating 34 includes water and an acrylic acid polymer that is acid neutralized, i.e. to a ph of 7, which increases its viscosity. Good results are achieved by the use of an acrylic acid polymer manufactured by the Specialty Polymers & Chemicals Division of the B. F. Goodrich Company of Cleveland, Ohio, United States of America, under the trademark Carbopol. Best results have been achieved with the resin designated as Carbopol 940 which has a molecular weight of about 4,000,000, although acceptable results have also been achieved with Carbopol 934 which has a molecular weight of about 3,000,000 and consequently has a lesser viscosity.

There are competing considerations in determining the preferred viscosity of the aqueous gel used. More specifically, the gel has to be sufficiently viscous so as to prevent the foamable polyurethane liquid mixture from permeating the cover but cannot be so viscous or pasty that it is not capable of being applied as a coating, nor can it be so viscous that it will not permit the gas and air from passing through the cover as the foaming proceeds. It has been found that a gel with a viscosity in the range of about 60,000 to 100,000 centipoise satisfies these competing considerations and that a viscosity of about 80,000 centipoise is most preferred. An aqueous gel with such a viscosity is sufficiently fluid so as to be coatable over the cover interior to fill its interstices and the interstices of the cover yarn and to also permit outward gas flow from the foaming while still being sufficiently viscous to prevent the foamable liquid mixture 48 from permeating the cover by occupying the interstices between its yarn fibers. This preferred viscosity is achieved when utilizing the Carbopol type acrylic acid polymer by neutralizing its acidity which provides branching of the straight molecules thereof to provide the viscosity increase. More specifically, the acid neutralization may be achieved by utilizing triethanolamine in the amount of 1.6 times by weight the amount of Carbopol used. Other types of acid neutralizers can also be used such as diethanolamide, and other components to increase the viscosity can likewise be utilized such as hydroxyethyl cellulose which increases the elastic strength and thus works well with stretchable cloths.

It should furthermore be appreciated that bonding between the cover and the foam can be enhanced by providing the aqueous gel with cross linkers such as polypropylene glycol, polyethylene glycol, glycerine, or any other cross linker having hydroxyl sites for reacting with the foam during the curing after filling the cover.

With reference to FIGS. 8 and 9, soft foam articles constructed in accordance with this invention are also illustrated as being embodied by different seat components. These seat components include the seat cushion 52, seat back 54, and headrest 56 illustrated as being mounted on a seat frame 57 in any suitable manner as shown in FIG. 8. The seat component can also be embodied by the armrest 58 illustrated in FIG. 9. Each of these seat components embodying the soft foam article 20 has a permeable cover 24 of a cloth type sheet construction with an interior 26 and an exterior 28 similar to the cover of the previously described embodiment. The only difference is that the cover of the seat embodiment has its outer pile 36 provided with short tufts 42' as opposed to long tufts as with the toy embodiment. Otherwise, the warp yarns 38, woof yarns 40, and connector yarns 44 are the same as in the previously described embodiment, and the aqueous gel coating 34 applied to the cover interior 26 during the in situ molding of the open cell soft polyurethane foam 30 within the cover is the same. More specifically, the gel coating 34 is applied to the cover interior 26 as shown in FIG. 10 so as to prevent the polyurethane foam liquid mixture 48 shown in FIG. 11 from permeating the cover as the foam is introduced into the cover for foaming that eventually fills the cover with the resultant foam 30 directly engaged with the cover interior a shown in FIG. 12 without permeating the cover.

Each of the embodiments described in FIGS. 1 through 12 has an exterior with an outwardly convex shape which as illustrated in FIG. 2 is achieved with the cover 24 functioning as the sole mold component for the foam during the in situ molding thereof with its outwardly convex shape. It is also possible for the cover to cooperate with another support member or the like to define the cavity in which the in situ foam molding takes place so long as the cover has sufficient area to permit escape of the gas generated during the foaming, which normally requires that the cover provide at least about 50% of the outer surface area of the article.

With reference to FIG. 13, the soft foam article 20 according to the present invention can also have an outwardly concave shape provided by a shaping member 60 that provides such shape by engaging the cover exterior 28 as illustrated. Such shaping may also require the use of a backing member 62 depending upon the shape to which the resultant article 20 is formed.

While the invention has particular utility with permeable covers made from yarn as described above, it is also possible for the cover to be leather, felt, or other porous materials of a sheet-like cloth construction. However, the gel coating 34 does work particularly well with cloth made from yarn that may be woven or knitted, etc.

One specific example of the gel is set forth below in Example I with the amount of each component indicating percentage by weight.

EXAMPLE I

| Component | Purpose | Weight |
|---|---|---|
| H₂O | Wets | 97.4% |
| Acrylic Acid Polymer (Carbopol 940) | Forms Gel | 1.0% |
| Triethanolamine | Neutralizes the acrylic acid polymer to increase viscosity | 1.6% |

Faster curing of the foam and bonding of the foam to the cover can be achieved by use of the gel of the following Example II.

EXAMPLE II

| Component | Purpose | Weight |
|---|---|---|
| H₂O | Wets | 87.4% |
| Acrylic Acid Polymer (Carbopol 940) | Forms Gel | 1.0% |
| Triethanolamine | Neutralizes the acrylic acid polymer to increase viscosity | 1.6% |
| Polypropylene Glycol | Faster curing and bonding to the cover | 5.0% |
| Polyethylene Glycol | Faster curing and bonding to the cover | 5.0% |

Bonding of the foam to the cover can be eliminated by the gel of Example III.

EXAMPLE III

| Component | Purpose | Weight |
|---|---|---|
| H₂O | Wets | 92.4% |
| Acrylic Acid Polymer (Carbopol 940) | Forms Gel | 1.0% |
| Triethanalamine | Neutralizes the acrylic acid polymer to increase viscosity | 1.6% |
| Volatile silicone | Prevents Bonding | 5.0% |

Instead of the silicone to prevent the bonding, cetyl alcohol (a fatty alcohol), oils or waxes of about the same percent by weight can be used to prevent bonding of the foam to the cover.

A more elastic gel that functions well with stretchable covers is provided by the gel of the following Example IV.

EXAMPLE IV

| Component | Purpose | Weight |
|---|---|---|
| H₂O | Wets | 95.4% |
| Acrylic Acid Polymer (Carbopol 940) | Forms Gel | 1.0% |
| Triethanolamine | Neutralizes the acrylic acid polymer to increase viscosity | 1.6% |
| Hydroxyethyl Cellulose | Increases elastic strength | 2.0% |

Good results with open weave cloth covers are achieved with a gel according to the following Example V, especially when drying and rewetting of the gel coating is utilized as described above.

EXAMPLE V

| Component | Purpose | Weight |
|---|---|---|
| H₂O | Wets | 92.4% |
| Acrylic Acid Polymer (Carbopol 940) | Forms Gel | 1.0% |
| Triethanolamine | Neutralizes the acrylic acid polymer to increase viscosity | 1.6% |
| Colloidal Silica (50 Micron Colloid) | Fills open weave cloths | 5.0% |

While the best modes for carrying out the invention have been described in detail, those familiar with the art to which this invention relates will recognize various alternative designs and embodiments for practicing the invention as defined by the following claims.

What is claimed is:

1. A soft foam article comprising:
   a permeable cover of a cloth sheet construction having an interior and an exterior between which the cover is permeable, and the interior of the permeable cover having a dried residue of an aqueous gel composition; and
   an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

2. A soft foam article as in claim 1 wherein the foam is bonded to the interior of the permeable cover.

3. A soft foam article as in claim 1 wherein the foam is free to move with respect to the interior of the permeable cover.

4. A soft foam article as in any one of claims 1 to 3 which is a toy having the exterior of its permeable cover provided with a plush pile.

5. A soft foam article as in any one of claims 1 to 3, which is a seat component.

6. A soft foam article as in claim 5 wherein the seat component is a seat cushion.

7. A soft foam article as in claim 5 wherein the seat component is a seat back.

8. A soft foam article as in claim 5 wherein the seat component is a headrest.

9. A soft foam article as in claim 3 wherein the seat component is an armrest.

10. A toy comprising:
    a permeable cover of a cloth sheet construction having an interior and also having an exterior including a plush pile, the cover being permeable between the interior and exterior thereof, and the interior of the permeable cover having a dried residue of an aqueous gel composition; and
    an open cell soft polyurethane foam molded in situ within the permeable cover in direct engagement with the interior of the permeable cover without permeating the cover or the pile of the cover exterior due to the aqueous gel composition on the cover interior prior to the gel composition drying and leaving the dried residue on the cover interior.

11. A seat component comprising:
    a permeable cover of a cloth sheet construction having an interior and an exterior between which the cover is permeable, and the interior of the permeable cover having a dried residue of an aqueous gel composition; and an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

12. A seat cushion comprising:

a permeable cover of a cloth sheet construction having an interior and an exterior between which the cover is permeable, and the interior of the permeable cover having a dried residue of an aqueous gel composition; and an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

13. A seat back comprising:

a permeable cover of a cloth sheet construction having an interior and exterior between which the cover is permeable, and the interior of the permeable cover having a dried residue of an aqueous gel composition; and an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

14. A headrest comprising:

a permeable cover of a cloth sheet construction having an interior and exterior between which the cover is permeable, and the interior of the permeable cover having a dried residue of an aqueous gel composition; and an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

15. An armrest comprising:

a permeable cover of a cloth sheet construction having an interior and exterior between which the cover is permeable, and the interior of the permeable cover having a dried residue of an aqueous gel composition; and an open cell soft polyurethane foam molded in situ within the permeable cover in direct engagement with the interior of the permeable cover without permeating the cover due to the aqueous gel composition on the cover interior prior to the gel composition drying and leaving the dried residue on the cover interior.

* * * * *

UNITED STATES PATENT AND TRADEMARK OFFICE
CERTIFICATE OF CORRECTION

PATENT NO.  :   5,096,760

DATED       :   March 17, 1992

INVENTOR(S) :   Christian Thary

It is certified that error appears in the above-identified patent and that said Letters Patent is hereby corrected as shown below:

```
Column 3, Line 43
after "FIG." insert --11--.
```

Signed and Sealed this

Twenty-eighth Day of September, 1993

Attest:

BRUCE LEHMAN

*Attesting Officer*         *Commissioner of Patents and Trademarks*